Dec. 24, 1957  E. L. MIDGETTE  2,817,353
THERMODYNAMIC STEAM TRAP
Filed Aug. 3, 1954
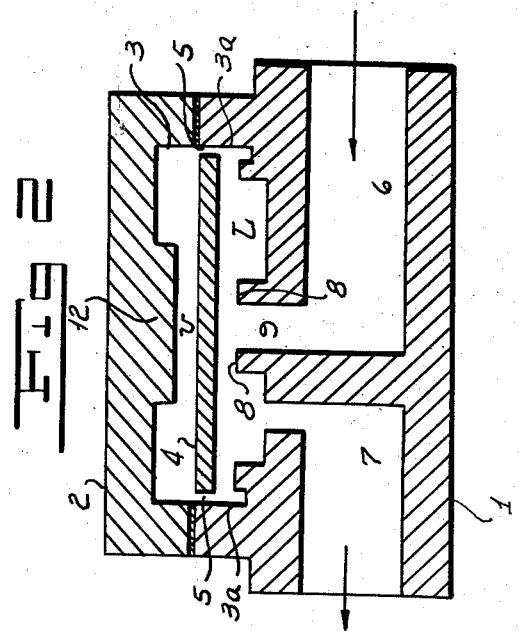
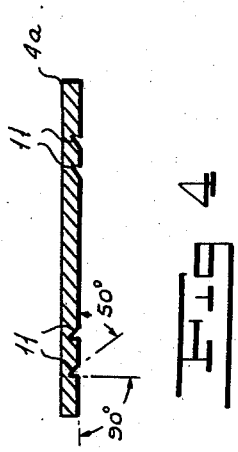
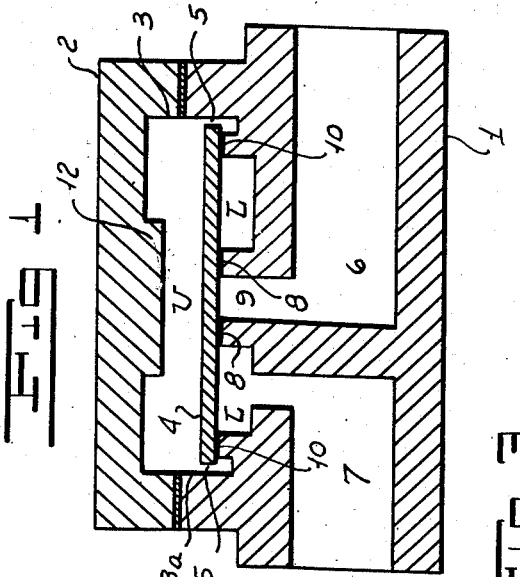
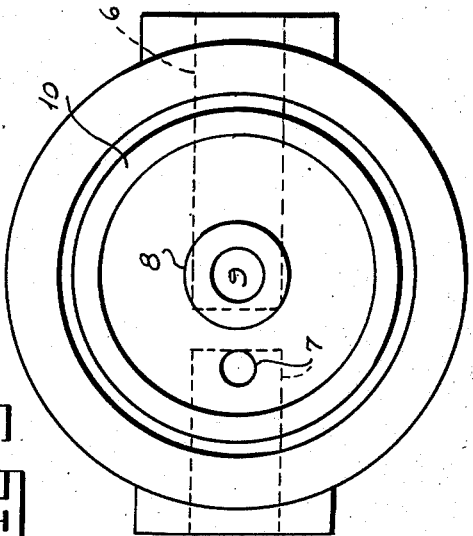
INVENTOR.
ERNST L. MIDGETTE
BY
ATTORNEY

United States Patent Office 2,817,353
Patented Dec. 24, 1957

2,817,353

THERMODYNAMIC STEAM TRAP

Ernst L. Midgette, Brooklyn, N. Y., assignor to Sarco Company, Inc., New York, N. Y., a corporation of New York Application August 3, 1954, Serial No. 447,617

10 Claims. (Cl. 137—183)

This invention relates to steam traps for use in both high and low pressure steam systems wherein steam traps are incorporated to evacuate condensation and air from the systems in an entirely automatic manner.

The present invention is particularly directed to steam traps of the so-called thermodynamic type. Such traps are provided with two chambers which are separated by an interposed sealing member operable with respect to fixed valve seats. One such seat is associated with the inlet of the trap, while the other seat is arranged to surround the outlet, so that, when the sealing member is free from engagement with its seats, fluid is free to pass unobstructedly through the trap. The passage of such fluid, from the system with which the trap is associated, brings about, after the evacuation of air and low temperature condensate, the generation of steam within the chamber on the valve seat side of the sealing member and this steam is communicated to the chamber back of the sealing member and builds up in the latter chamber sufficient force to overcome the pressure of the steam in the associated system and thereby bring about a seating of the sealing member upon its seats for the purpose of shutting off the flow of fluid from the system through the trap. This type of thermodynamic trap has long been used and is thoroughly familiar to those skilled in the art.

However, all of such traps which have heretofore been successful in practical operation have been provided with bleeder ducts or orifices of one kind or another to permit the slow reduction of pressure built up in the chamber back of the sealing member in order that such pressure will not be prolonged to such extent as to permit undesirable accumulation of air or condensate in the system. These bleeder ducts or orifices have been placed so as to provide a limited free exit of such pressures and they were calculated to and supposed to control in a large measure the periodic movements of the sealing member to seal or unseal the trap.

Experience has shown, however, that in traps so constituted, this leakage, which takes place during the otherwise seated periods of the sealing member, tends to and actually does release the sealing member from its seat at times and during periods when it should remain seated and, as a result, all of these traps pass an excessive amount of live steam at intermittent periods and in some cases constantly. There results, over a protracted period, a loss of appreciable amounts of useful steam. This is particularly noticeable in high pressure systems and constitutes an economic waste.

Moreover, in a trap of this character, the mere provisions of a bleeder duct is not enough. The capacity of such a duct to pass fluids must be accurately engineered in order that it may be properly coordinated with the other parts of the valve to function in the manner desired for any particular installation. In practice, such a duct must be carefully calibrated and that calibration must be maintained at all times during operation of the trap. Inasmuch as these ducts must frequently be made very small, a very serious problem arises in the maintenance of this calibration for extraneous matter such as scale particles and the like tend to lodge in the duct, with the result that the operating characteristics of the trap are thereby changed and the proper functioning of the trap is seriously affected.

With the foregoing considerations in mind, the primary object of the present invention is to provide a novel steam trap, for use in steam systems of all kinds, both high and low pressure, wherein the seating of the sealing member effects a positive and complete seal. There are no bleeder ducts or orifices to bring about leakage or loss of steam during the time the sealing member is seated. In the trap of this invention, all of the aforesaid disadvantages encountered in traps provided with bleeder ducts, are entirely eliminated and there results a trap which, when properly engineered to particular conditions, will operate consistently and produce uniform periodic operations throughout the life of the trap.

Another object of this invention is to provide a novel trap wherein the sealing member will remain seated to effectually seal the system until the pressure back of the sealing member is reduced or diminished, through a lowering in temperature of the steam acting against the same by conduction and/or radiation of heat to the surrounding atmosphere, to the point where it, acting over the effective area of the back of said sealing member, does not constitute a force great enough to resist the unseating of that member by the pressure in the system impressed upon a smaller area of its opposite side. When this occurs, the sealing member is unseated and fluid is free to flow unobstructedly through the trap. The respective parts of the trap are so proportioned that the effective area of the sealing member, operated upon by the pressure in the system, is so related to the counteracting area of the back of said member as to effect the desired efficient and economical periodic operation of said sealing member.

A further object of the invention is to provide a trap which is more cheaply manufactured than prior traps, more simple in its operation and more economical in use, and one which required little or no maintenance over protracted periods of operation.

Features of the invention, other than those adverted to, will be apparent from the hereinafter detailed description and appended claims when read in conjunction with the accompanying drawings.

The accompanying drawings illustrate different practical embodiments of the invention, but the constructions therein shown are to be understood as illustrative, only, and not as defining the limits of the invention.

Fig. 1 is a schematic showing of a trap embodying the present invention, this view being a central section through a trap with the sealing member in seated position.

Fig. 2 is a view like Fig. 1, but illustrating the sealing member unseated.

Fig. 3 is a plan view of the body of the trap with the bonnet and sealing member removed.

Fig. 4 is a diametric central section through a modified form of sealing member.

Referring to the drawings, the trap is shown as having a valve housing comprising a body or case 1 provided with a cap or bonnet 2, forming with the body a circular cavity 3. Within this cavity is positioned a sealing member 4 shown as a flat circular disk which extends across the cavity, after the manner of a partition, to divide the cavity into an upper chamber U back of the sealing member and a lower chamber L forward of said sealing member. The overall size of the sealing member is such as to leave a constricted passage 5 circumferentially of the sealing member and between its outer periphery and the inner surface 3a of the contiguous circular lateral wall of the cavity 3. The inlet passage and outlet passages of the trap are respectively designated 6 and 7.

The trap is adapted to be associated with a steam system by connecting the inlet passage 6 to some appropriate portion of the system. In many instances, a single trap will suffice, although in other systems a number of traps may be desirable. The connection with the system may be accomplished through the use of threaded pipe connections directly to the body or by the use of typical flanged pipe connectors.

Located centrally of the circular lower chamber L and positioned cross-axially thereof is a raised valve seat 8 provided with a port 9 communicating with the inlet passage 6 of the trap. The sealing member, when in engagement with said seat 8, functions to positively and effectively seal the port 9 against the flow of fluid from the associated steam system into either of the chambers U or L of the cavity 3. The outlet passage 7 of the trap leads from the base of the lower chamber L.

Also located in the lower chamber L and adjacent the inner surface 3a of the lateral wall thereof, is another raised valve seat 10. This seat is remote from and wholly independent of the inlet valve seat 8 and it has absolutely nothing to do with sealing of the trap against the flow of fluid from the inlet port 9 into any part of the confines of the cavity 3. On the contrary, it is interposed between and intermediate the lower chamber L and the upper chamber U, which latter is back of the sealing member 4. Operating in conjunction with the sealing member, it serves solely to control the passage of fluid from the interior of the lower chamber L into the upper chamber U, and, to positively and completely seal the upper chamber from the lower chamber when the sealing member is engaged with said seat 10. There is no bleeder duct between these chambers and consequently this seal completely isolates said chambers from one another.

Both of the seats 8 and 10 are shown, for the purpose of illustration as circular, flat and as occupying the same plane cross-axially of the sealing member and consequently those portions of the sealing member which engage with said seats are flat and occupy a common cross-axial plane. It should, however, be clearly understood that the seats may be otherwise than circular and flat and may be arranged at different elevations provided that those portions of the sealing member which cooperate therewith are shaped and relatively positioned to simultaneously engage with and disengage from both seats to completely seal or unseal both passages which they respectively control.

When the trap of this invention is installed in a steam system, it functions in the following manner: Suppose, for example, that the system is cold and that the system is being heated or steam being admitted into the same. Under these conditions, there will ordinarily be both air and condensate in the system. At this time the sealing member will be either open or closed depending upon its position. As the steam is generated in or is admitted to the system and builds up pressure, the sealing member will remain in its initial position. If unseated at that time, the increase of pressure in the system will in due course force the air and condensate therein through the trap in an unobstructed manner.

If the sealing member is in closed position at the beginning of this build up of pressure, it will immediately open due to the pressure of the air or condensate acting against its under side at the inlet port 9, allowing free flow of the air or condensate through the trap.

This free flow of fluid from the system will continue until the temperature of the undesirable fluid reaches a point where some of the liquid portion of such fluid flashes into steam as it flows across the inlet seat 8. Most of this steam will exit through the outlet passage 7 but a portion thereof will pass through the constricted passage 5, enter the upper chamber U, back of the sealing member, and build up pressure in this latter chamber. As this phenomenon continues and increases in intensity, the pressure in the chamber U, acting against the back of the sealing member, will exert sufficient force thereon to force it to the inlet seat 8, thus completely stopping all flow from the system and simultaneously firmly engaging the sealing member with its seat 10 to effectually seal the chamber U back of said sealing member.

It is pertinent to note in this connection that, when the stage is reached at which the fluid passing through the trap has considerable velocity, some of such fluid at this velocity will pass across the upper surface of the seat 8, thence across the lower chamber L and outlet passage 7 and thence across the seat 10, to impinge against the wall surface 3a with such force that it will be deflected into the upper chamber U to facilitate and expedite the building up of pressures in that chamber with consequent rapid seating of the sealing member against both of the seats 8 and 10. The kinetic energy of the fluid flowing across the seat 10 and diverted into the upper chamber U will, in the manner described, convert the kinetic energy involved into potential energy within the chamber U for the purpose of seating the sealing member.

After being seated in the manner described, the sealing member will remain seated to form a seal which is functionally leakproof so long as the force exerted by the pressure in the chamber U back of the sealing member exceeds the force exerted by the pressure in the system through the inlet port 9 against the opposite side of said member in conjunction with any back pressure remaining in the chamber L. Pressure in the chamber U will, however, diminish, due to radiation and conduction of the heat of the steam therein, so that, in due course, the force thereby exerted against the back side of the sealing member will fall below the force exerted at the front side at the port 9 and chamber L. When this condition is reached, the pressure in the system will cause an unseating of the sealing member and fluid is again free to pass unobstructedly through the trap until the operations hereinbefore described are repeated, except of course that the system will then be fully heated and the operations will be more expeditiously carried out.

The operations of the sealing member are periodic in nature and the frequency thereof may be determined in various ways. For example, in Figs. 1 and 2, the seat engaging side of the sealing member is shown in the form of a smooth flat surface well adapted to utilize the kinetic feed of pressure into the upper chamber in the manner described. However, if this feed is too rapid for a particular system, the operation of this kinetic energy may be modified by providing the under surface of the sealing member with appropriate means to modify the kinetic flow. One form of such means is shown in Fig. 4. Here there is formed in the under side of the modified sealing member 4a, a series of concentric grooves 11. These grooves may be of any desired cross sectional shape, but, in the showing of this figure, the outer periphery of each is made normal to the under surface of the sealing member 4a, while the inner periphery is inclined at an angle of substantially 50° to the same surface. The presence of these grooves, of which there may be any desired number, serves to set up a flow disturbance and consequent turbulence which so modifies the kinetic flow as to delay the seating of the sealing member. Similar conditions of turbulence may be set up by providing the under side of the sealing member with depressions or recesses of other than the annular form shown or by forming downwardly projecting lips on said surface.

Another way of controlling the periodic operations of the sealing member is through the relative cross sectional areas of the port 9 and the back surface of the sealing member 4. It will of course be appreciated in this connection that inasmuch as the frequency of the periodic movements of the sealing member will depend largely upon the character of the system in which the trap is incorporated and, more particularly, the steam pressures carried therein, the amount of condensate which the system accumulates and other factors well understood by those skilled in the art, it is impractical to here set out fixed unvariable proportions. However, the proportions of the trap should be such that the ratio of the area of the back side of the sealing member to the area of the inlet port 9 and its surrounding seat 8 should be directly proportional to the ratio of the difference between the inlet pressure at the port 9 and the pressure in chamber L to the difference between the pressure in chamber U and the pressure in chamber L.

When these conditions or ratios are substantially followed in a trap of the character herein described, the duration of the periodic movements will effectually maintain the steam system free from undesirable air or condensate (assuming of course that the traps are properly located) with a minimum loss of useful steam and will bring about marked savings as compared with any thermodynamic trap embodying bleeder ducts or orifices.

It is of course essential to the satisfactory operation of a trap of this kind that a chamber be maintained at all times at the back side of the sealing member. This may be assured mechanically in any appropriate manner, as, for example, by providing a boss 12 either on the inner surface of the bonnet or cap or on the upper surface of the sealing member.

In the drawings, the case, bonnet, and internal parts of the trap have been shown as circular. However, in practice, these parts may be of any desired or appropriate shape. No attempt has been made to show in these drawings purely engineering details of construction of the several parts of the trap as those may be readily supplied by those skilled in the art to which this invention pertains.

It will be apparent from the foregoing that the inlet 6 of the trap feeds to the lower chamber L which, in effect, functions as an outlet chamber to discharge fluid through the trap outlet which leads from its base. The seat 10 functions as a pressure retaining valve seat and cooperates with the sealing member to positively seal the upper chamber U which operates as a pressure chamber. The constricted passage 5, peripherally of the sealing member provides the only communication between the chambers U and L and, consequently, when the sealing member is seated, said pressure chamber is completely sealed and entirely isolated from the outlet chamber as well as from the outlet of the trap. By preference, the pressure retaining valve seat 10 surrounds the inlet valve seat 8 with the trap outlet between them. It is convenient to make these seats coaxial and arrange them in a common plane cross-axial of the sealing member. As the pressure retaining valve seat cooperates with the sealing member to form therewith the sole means for sealing the pressure chamber, so does the wholly independent inlet valve seat similarly coact with said sealing member to form therewith the only means for sealing the inlet of the trap.

All of these features, functioning in the manner described, result in a trap which is economical to manufacture, of high efficiency and reliability, and one which may be depended upon to operate indefinitely with little or no maintenace requirements.

The foregoing detailed description sets forth the invention in its preferred practical forms but the invention is to be understood as fully commensurate with the appended claims.

Having thus fully described my invention, what I claim as new and desire to secure by Letters Patent is:

1. A thermodynamic steam trap comprising a housing provided therein with a cavity, an imperforate sealing member loosely positioned within the cavity and dividing the same into outlet and pressure chambers, an inlet leading to the outlet chamber and there terminating in an inlet valve seat at which the inlet will be completely sealed when engaged by the imperforate sealing member, an outlet leading from the outlet chamber, and a pressure retaining valve seat positioned remote from and independent of the inlet valve seat and interposed between said chambers, said imperforate sealing member being shaped to simultaneously engage with both of said valve seats to completely seal the inlet and simultaneously completely seal the pressure chamber from the outlet chamber and being retractable from both seats to allow the free flow of fluid through the housing and also to permit the passage of fluid from the outlet chamber into the pressure chamber.

2. A trap according to claim 1, comprising a unitary sealing member peripherally spaced from the wall of the cavity to provide a constricted passage between the two chambers through which fluid may pass only when the sealing member is retracted from both valve seats, there being no other communication between said chambers.

3. A trap according to claim 2, wherein the area of the sealing member exposed within the confines of the pressure chamber exceeds the area of said sealing member exposed within the confines of both the outlet chamber and the inlet when the sealing member is engaged with said seats.

4. A thermodynamic steam trap comprising a housing provided therein with a cavity, an imperforate sealing member loosely positioned within the cavity and dividing the same into outlet and pressure chambers, an outlet leading from the outlet chamber, an inlet leading to the outlet chamber and there terminating in an inlet valve seat which, when engaged by the imperforate sealing member, will per se form therewith a fluid tight seal and completely isolate the inlet from both of said chambers and the outlet, and a pressure retaining valve seat remote from and independent of the inlet valve seat and interposed between the said chambers and when so engaged by the sealing member forming therewith a fluid-tight seal and completely isolating the compression chamber from the outlet chamber independently of the inlet valve seat.

5. A thermodynamic steam trap comprising a housing provided therein with a cavity, an imperforate sealing member loosely positioned within the cavity and dividing the same into outlet and pressure chambers, an inlet leading to the outlet chamber and there terminating in an inlet valve seat engageable by the imperforate sealing member to form therewith the only means for controlling the flow of fluid from the inlet, and a pressure retaining valve seat remote from and independent of the inlet valve seat and engageable by the imperforate sealing member and forming therewith the only means to completely isolate the pressure chamber from the outlet chamber.

6. A trap according to claim 5, comprising a unitary sealing member peripherally spaced from the wall of the cavity to provide a constricted passage between the two chambers through which fluid may pass only when the sealing member is retracted from both valve seats, there being no other communication between said chambers.

7. A trap according to claim 2, wherein the surface of the sealing member opposed to the valve seats is provided between the inlet and pressure retaining valve seats and spaced from both of them with means to produce turbulence in a stream of fluid flowing from the inlet when the sealing member is retracted from said seats.

8. A trap according to claim 7, wherein said means comprises recesses in that surface of the sealing member.

9. A trap according to claim 8, wherein said recesses comprise concentric grooves.

10. A trap according to claim 7, wherein the means to produce turbulence comprises at least one annular groove concentric with the inlet.

References Cited in the file of this patent

UNITED STATES PATENTS

| | | |
|---|---|---|
| 2,234,387 | Schott | Mar. 11, 1941 |
| 2,634,744 | Wells | Apr. 14, 1953 |

FOREIGN PATENTS

| | | |
|---|---|---|
| 118,196 | Australia | Feb. 28, 1944 |